(12) United States Patent
Uchida

(10) Patent No.: US 6,604,781 B2
(45) Date of Patent: Aug. 12, 2003

(54) VEHICLE BODY STRUCTURE

(75) Inventor: Kousaku Uchida, Okazaki (JP)

(73) Assignee: Mitsubishi Jidosha Kogyo Kabushiki Kaisha (JP)

( * ) Notice: Subject to any disclaimer, the term of this patent is extended or adjusted under 35 U.S.C. 154(b) by 0 days.

(21) Appl. No.: 10/102,607

(22) Filed: Mar. 20, 2002

(65) Prior Publication Data

US 2002/0167200 A1 Nov. 14, 2002

(30) Foreign Application Priority Data

Mar. 22, 2001 (JP) .......................................... 2001-082902

(51) Int. Cl.[7] ................................................ B62D 25/20
(52) U.S. Cl. ..................... 296/204; 296/187; 296/188; 296/29; 296/203.01; 296/209
(58) Field of Search .............................. 296/203.01, 204, 296/209, 29, 63, 65.02, 65.03, 188, 189, 187

(56) References Cited

U.S. PATENT DOCUMENTS

| | | | | |
|---|---|---|---|---|
| 4,514,008 A | * | 4/1985 | Watanabe et al. ........... | 296/204 |
| 4,572,571 A | * | 2/1986 | Malen ......................... | 296/197 |
| 4,892,350 A | * | 1/1990 | Kijima ........................ | 296/204 |
| 5,352,011 A | * | 10/1994 | Kihara et al. ................ | 296/204 |
| 5,435,618 A | * | 7/1995 | Sacco et al. ................. | 296/188 |
| 5,921,618 A | * | 7/1999 | Mori et al. .................. | 296/188 |
| 6,007,145 A | * | 12/1999 | Tezuka ........................ | 296/204 |
| 6,129,412 A | * | 10/2000 | Tanuma ....................... | 296/204 |
| 6,375,247 B1 | * | 4/2002 | Volz et al. .................... | 296/66 |

FOREIGN PATENT DOCUMENTS

JP        2567290         12/1997

* cited by examiner

*Primary Examiner*—D. Glenn Dayoan
*Assistant Examiner*—Greg Blankenship
(74) *Attorney, Agent, or Firm*—Rossi & Associates

(57) ABSTRACT

A vehicle body structure comprises a first cross member and a second cross member disposed on a floor (11) between a side sill (12) provided at both sides of a vehicle body and a floor tunnel (14) provided in a longitudinal direction in middle of the vehicle body, and a third cross member having one end, a front edge, and a rear edge thereof connected to the side sill (12), the first cross member (15), and the second cross member (16), respectively, between the first cross member (15) and the second cross member (16). This enables an improvement in stiffness of the vehicle body against side impact efficiently by a simple reinforcing structure.

8 Claims, 5 Drawing Sheets

VEHICLE BODY STRUCTURE

BACKGROUND OF THE INVENTION

This non-provisional application claims priority under 35 U.S.C. §119(a) on Patent Application No. 2001-82902 filed in Japan on Mar. 22, 2001, which is herein incorporated by reference.

1. Field of the Invention

This invention relates to a vehicle body structure for increasing the stiffness of a vehicle body against side impact of a motor vehicle.

2. Description of the Related Art

In a motor vehicle, the structure of the side of a vehicle body, especially the structure of a floor portion, is important to provide a vehicle body effective for side impact. There is known an example of a conventional structure of the front side of a floor portion in a motor vehicle (i.e. sedan type passenger car) as shown in FIG. 8.

A brief description will now be given of the conventional structure with reference to FIG. 8.

A side sill (12) is disposed in a side edge portion of a front floor (11), and a center pillar (13) is provided upward the side sill (12).

Further, front of front floor cross member (15) and rear of front floor cross member (16) are provided in the neighborhood of a seat position between the side sill (12) above the front floor (11) and a floor tunnel (14) in the middle of the front floor (11). It should be noted that reference numeral 17 in FIG. 8 denotes a seat mounting bracket.

When such a vehicle is collided from the side, impact force toward inside of a vehicle compartment is applied to the center pillar (13) and around the lower portion of front and rear door (not shown) in many cases. Not only when such impact is applied to the center pillar (13), but also when it is applied to the front or rear door, the impact force is transmitted to the center pillar (13) and therefore, the center pillar (13) (especially, its lower portion) has an inclination to be deformed toward the inside of the vehicle compartment.

Therefore, to avoid the penetration of the center pillar (13) into the vehicle compartment in vehicular side collision, it is important to ensure the sufficient stiffness of the front floor (11) supporting the basic portion of the center pillar (13). Cross members (15), (16) are most important to increase the stiffness of the front floor (11).

These cross members (15), (16), as shown in FIG. 9, have substantially hat-shaped cross-sections, and it is very effective to make larger shape of cross-sections of these cross members (15), (16), especially the heights (H1), (H2) thereof in order to increase the stiffness of the front floor (11).

However, since a front seat will be provided above these cross members (15), (16), it is difficult to make larger the heights (H1), (H2) thereof. Especially, as the rear of the front floor cross member (16) is positioned in the neighborhood of the foots of a passenger sitting on a rear seat, the height (H2) of the cross member (16) is required to be low.

Therefore, if the sufficient body stiffness against side impact cannot be achieved only by reinforce of the cross members (15), (16), it is necessary to considerably reinforce the center pillar (13), the side sill (12), a front pillar (not shown), and so forth.

Japanese Utility Model No. 2567290 discloses the technology of rising the stiffness of the vehicle body against side impact that allots impact in side collision to a first cross member (corresponding to the front of the front floor cross member (15)) provided in front of a third cross member and a second cross member provided at the rear of the third cross member, and transmits the impact to the floor tunnel by opposing the third cross member (corresponding to the rear of the front floor cross member (16)) to the floor tunnel at a predetermined intervals. However, in this case, a problem similar to the above-described one is encountered, since the pillar, the side sill and so on are heavily burdened, and thus they need to be considerably reinforced.

It is therefore an object of the present invention to provide a body structure, which enables an improvement in stiffness of a vehicle body against side impact efficiently by a simple reinforcing structure.

SUMMARY OF THE INVENTION

To attain the above object, according to the present invention, a first cross member, a second cross member, and a third cross member are provided on a floor portion positioned between a side sill portion provided in both side portions of a vehicle body and a floor tunnel portion provided in a longitudinal direction in the middle of the vehicle body.

One end of the first cross member is supported on the side sill portion, and the other end of the first cross member is provided on the floor tunnel portion to support the front of a seat, and one end of the second cross member is provided on the side sill portion and the other end of the second cross member is provided on the floor tunnel portion to support the rear of the seat. The third cross member is also disposed between the first cross member and the second cross member to be parallel with them such that one end of thereof is provided on the side sill portion, the front end of thereof is provided on the first cross member, and the rear end of thereof is provided on the second cross member.

Therefore, since side impact of the vehicle body is also applied to the third cross member in addition to the first cross member and the second cross member in side collision, it becomes easy to prevent the penetration of a vehicle side portion into the vehicle compartment in side impact

BRIEF DESCRIPTION OF THE DRAWINGS

The name of this invention, as well as other objects and advantages thereof, will be explained in the following with reference to the accompanying drawings, in which like reference characters designate the same or similar parts throughout the figures and wherein.

DETAILED DESCRIPTION OF THE PREFERRED EMBODIMENTS

A preferred embodiment of the present invention will now be described with reference to the drawings.

Figure 1:
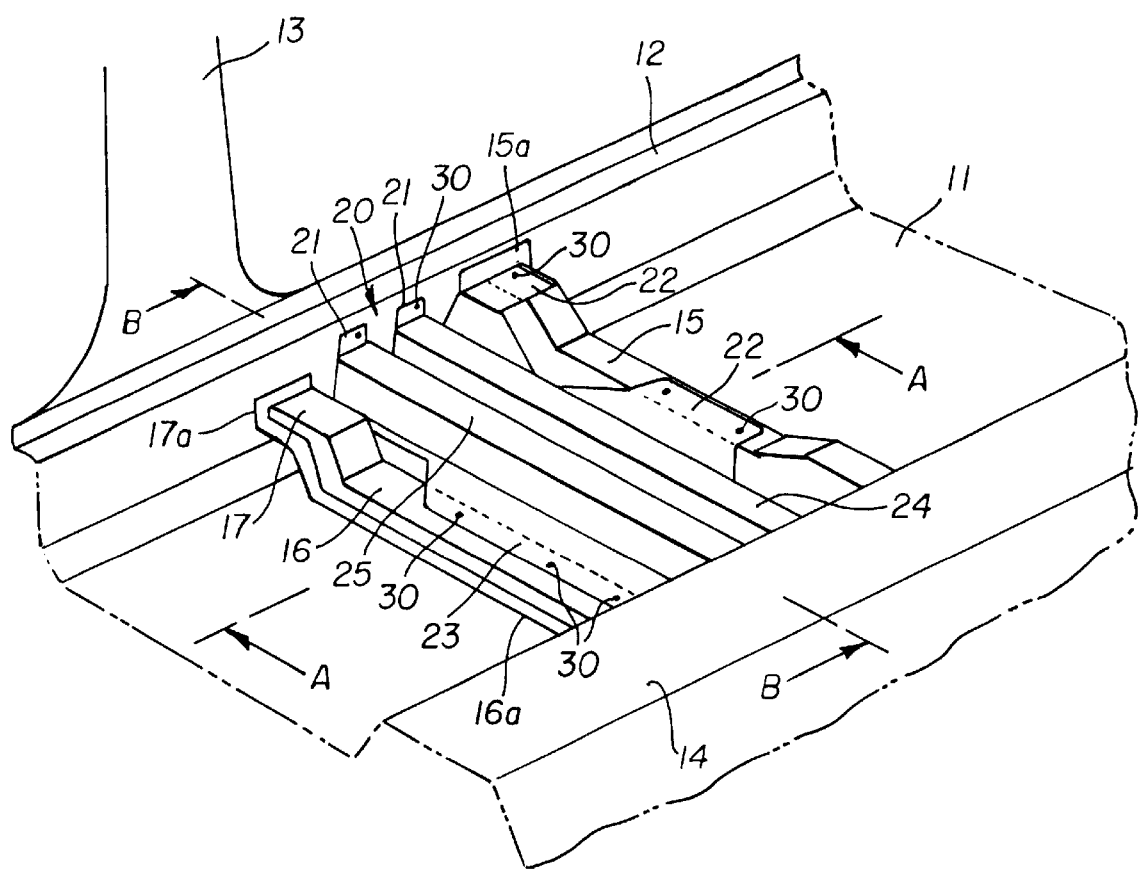
FIG. 1 is a perspective view showing a front floor portion (left half part) of a vehicle body structure according to an embodiment of the present invention.
Figure 2:
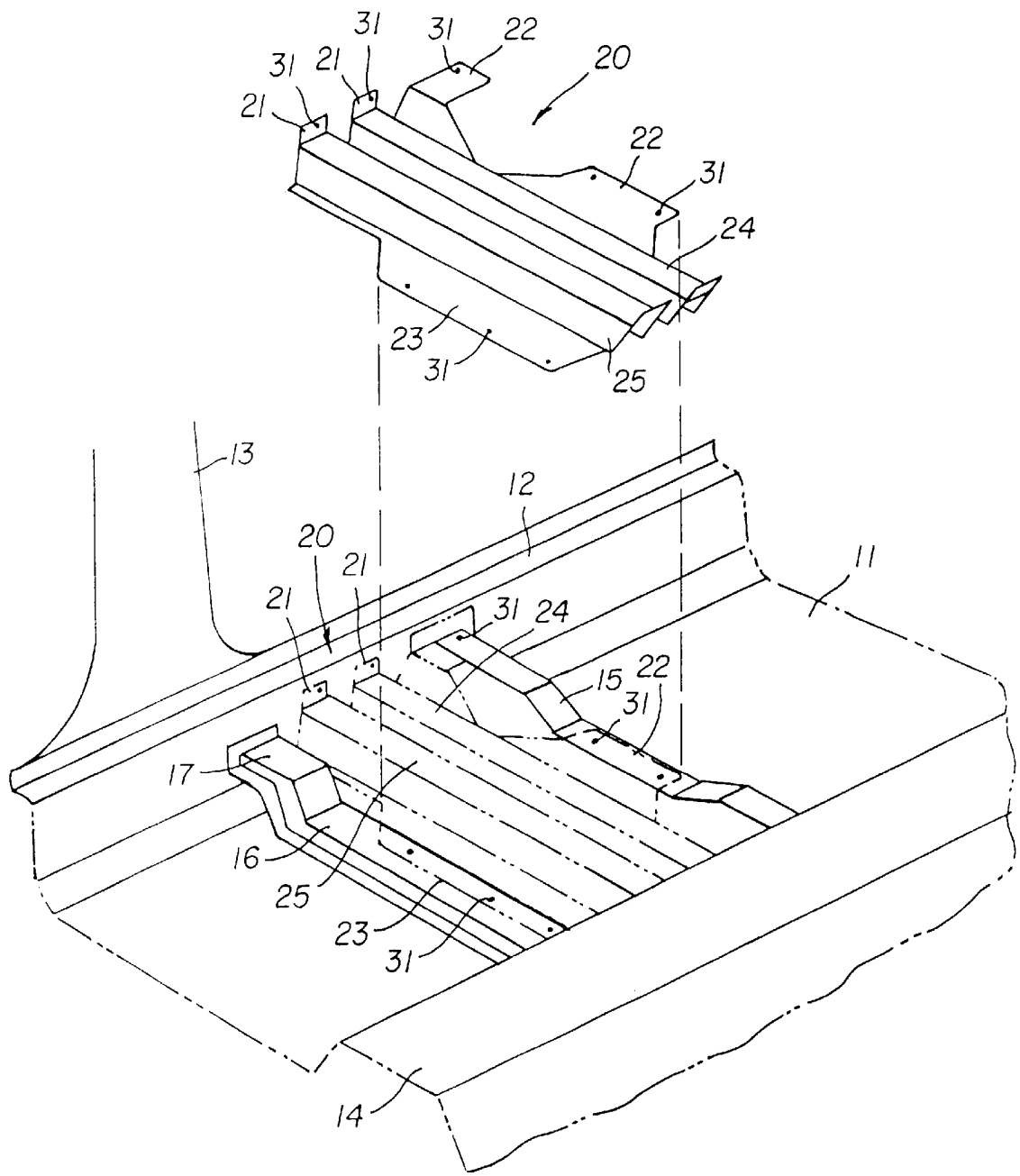
FIG. 2 is a perspective view useful in explaining how a third cross member is mounted on the vehicle body structure according to the embodiment.

As shown in FIG. 1 and FIG. 2, a vehicle body structure according to the present embodiment, has a front floor (a floor portion) (11) constituting a floor of the front portion of a vehicle body, a side sill (a side sill portion) (12) provided on a side edge portion (both side portions) of the front floor (11), and a floor tunnel (14) provided in central parts of the right and left of the front floor (11) (i.e. in a central part of the vehicle body), front of a front floor cross member (a first cross member, hereinafter referred to as "front cross member") (15), rear of the front floor cross member (a second cross member, hereinafter referred to as "cross member rear") (16), and an additional cross member (a third cross member) (20) are provided on the front floor (11). A center pillar (13) is provided upward a side sill (12).

The front cross member (15) has its one end thereof connected to the side sill (12) and the other end thereof provided on the floor tunnel (14), and is disposed on the front floor (11) to support the front portion of a front seat (not shown). The rear cross member (16) also has one end thereof provided on the side sill (12) and the other end thereof provided on the floor tunnel (14), and is disposed on the front floor (11) to support the rear portion of the front seat. It should be noted that reference numeral (17) denotes a seat mounting bracket.

Figure 8:
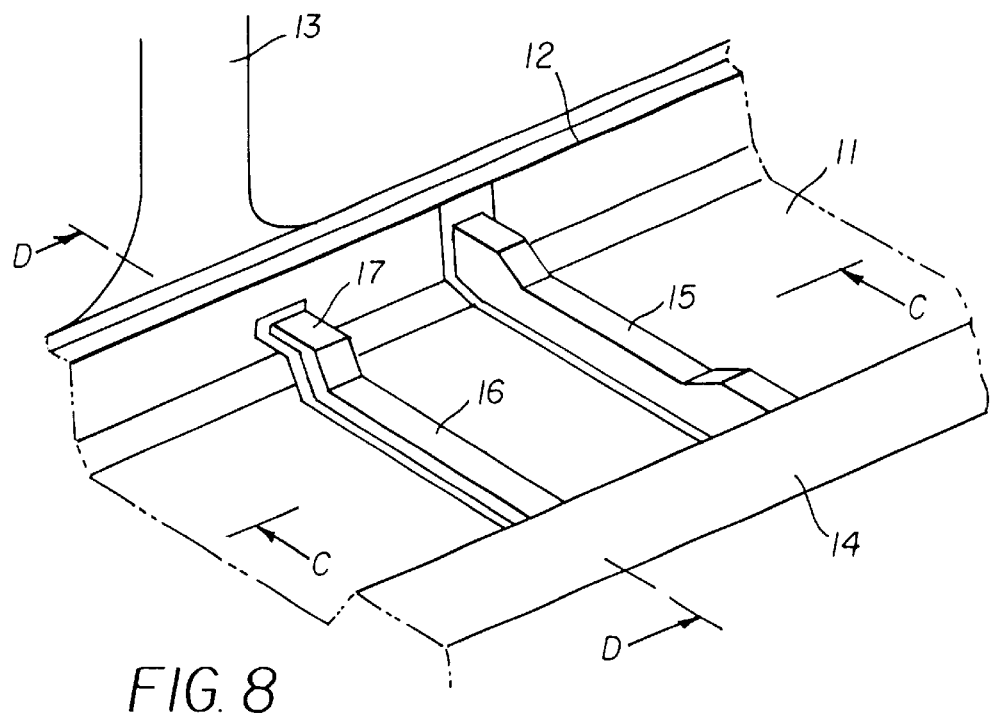
FIG. 8 is a perspective view showing a front floor portion (left half part) of a conventional vehicle body structure.
Figure 9:
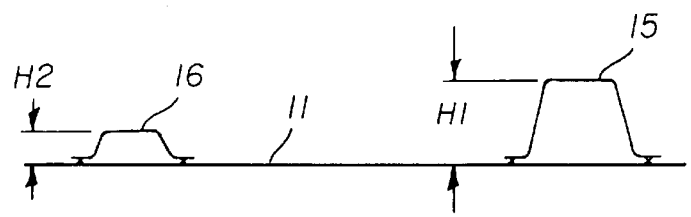
FIG. 9 is a cross-sectional view (a cross-sectional view taken along an arrow C—C in FIG. 8) showing a principal part of the conventional vehicle body structure.
Figure 10:
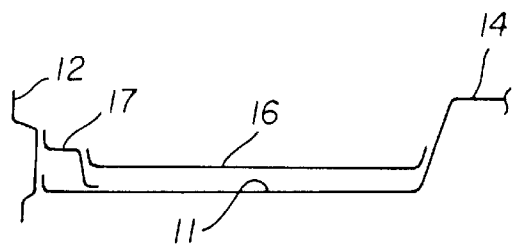
FIG. 10 is a cross-sectional view (a cross-sectional view taken along an arrow D—D in FIG. 8) showing a principal part of the conventional vehicle body structure.

These cross members (15), (16) and the seat mounting bracket (17) are constructed like the conventional structure (refer to FIG. 8), and peripheral edge portions (15a), (16a) of respective cross members (15), (16) and a peripheral edge portion (17a) of the seat mounting bracket (17) are fixed to the front floor (11), the side sill (12) and the floor tunnel (14) by welding or the like.

The additional cross member (20) is disposed between the front cross member (15) and the rear cross member (16) on the front floor (11), and has one end thereof fixed to the side sill (12), the front edge thereof fixed to the front cross member (15), and the rear edge thereof fixed to the rear cross member (16) by using of bolts (30). It should be noted that respective ones of holes (31) shown in FIG. 2 are bolt inserting holes formed in the additional cross member (20), the side sill (12), and the cross members (15), (16).

Figure 3:
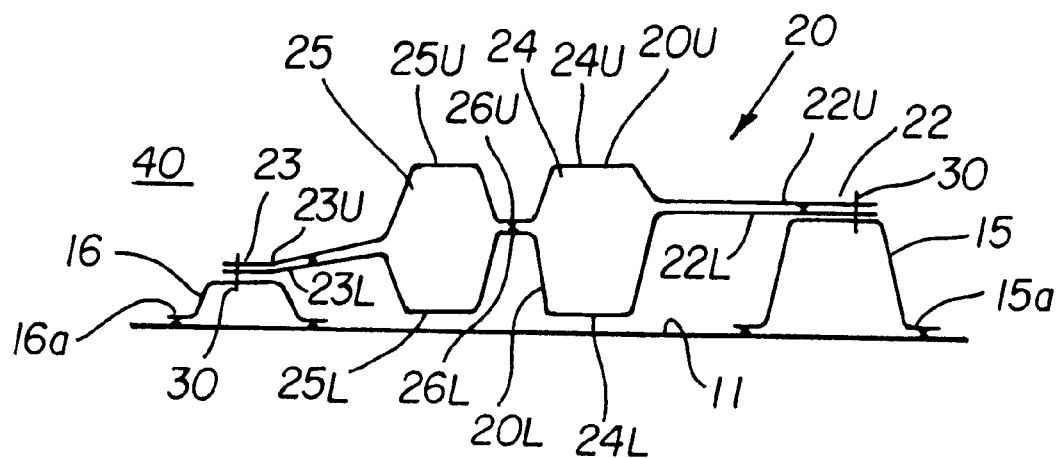
FIG. 3 is a cross-sectional view (a cross-sectional view taken along an arrow A—A in FIG. 1) showing a principal part of the vehicle body structure according to the embodiment.
Figure 4:
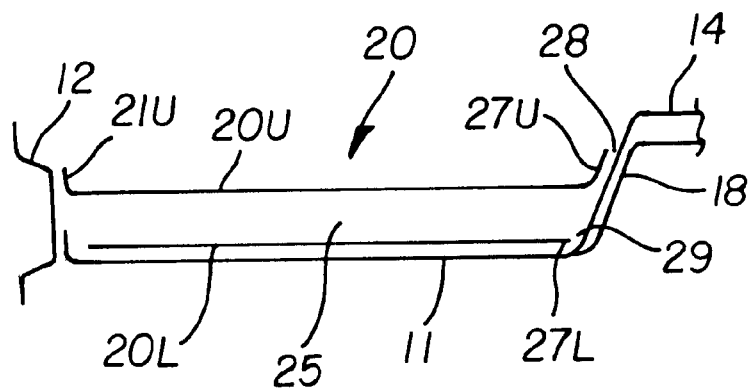
FIG. 4 is a cross-sectional view (a cross-sectional view taken along an arrow B—B in FIG. 1) showing a principal part of the vehicle body structure according to the embodiment.

The additional cross member (20), as shown in FIGS. 3 and 4, is constructed such that an upper panel (20U) and a lower panel (20L) are stacked on each other, and two closed sections (24), (25) extending in a direction of the width of the vehicle, are formed in the middle of the additional member 20 in a longitudinal direction of the vehicle. It should be noted that since the rear portion of the additional cross member (20) corresponds to a rear passenger's foot space (40), the closed section (25) at the rear is formed in front of this foot space (40).

Namely, the upper panel (20U), as shown in FIG. 3, has substantially flat front edge portion (22U) and rear edge portion (23U), and downward concave parts (24U), (25U) extending in the direction of the width of the rear cross member. The lower panel (20L), as shown in FIG. 3, has substantially flat front edge portion (22L) and rear edge portion (23L), and upward concave parts (24L), (25L) extending in the direction of the width of the vehicle. By stacking the upper panel (20U) and the lower panel (20L) on each other, the closed section (24) is formed by the concave parts (24U), (24L), and the closed section (25) is formed by the concave parts (25U), (25L).

The upper panel (20U) and the lower panel (20L) are integrated together in advance by connecting the front edge portions (22U) and (22L) to each other, connecting the rear edge portions (23U) and (23L) to each other, connecting a downward protruding portion (26U) formed between the concave portions (24U), (25U) and a downward protruding portion (26L) formed between the concave portions (24L), (25L) to each other, and then connecting the upper panel (20U) and the lower panel (20L) to each other. The integrated upper panel (20U) and lower panel (20L) are then mounted on the front floor (11). Each portion of the upper panel (20U) and the lower panel (20L) will be secured by spot welding or the like.

Further, the front edge (22) of the additional cross member (20) has the front edge (22) is comprised of the respective front edge portions (22U), (22L), and the rear edge (23) of the additional cross member (20) is comprised of the respective rear edge portions (23U), (23L). One end (21) of the additional cross member (20) is comprised of a flange (21U) formed on one end (side portion of the vehicle side body) of the respective concave portions (24U), (25U) of the upper panel (20U).

Furthermore, the other end (side edge of the floor tunnel (14) in middle of the vehicle body) of the additional cross member (20) is constituted by a flange portion (27U) formed at the other end (at the side of the floor tunnel (14) in middle of the vehicle body) of the concave portions (24U), (25U) of the upper panel (20U), and this flange portion (27U) is formed in substantially parallel with an opposed face of the floor tunnel (14) and is provided with a gap (28) with respect to the floor tunnel (14). In this embodiment, the other end (27L) (side of the floor tunnel (14) in middle of the vehicle body) of the respective concave parts (24L), (25L) in the lower panel (20L) does not have any flange portion, but this other end (27L) is also positioned to have a gap (29) with respect to the floor tunnel (14).

The side edge (27U) and/or (27L) at the side of the floor tunnel (14) in the additional cross member (20) may be fixed to the floor tunnel (14) by fastening with a bolt.

Furthermore, the reason why the gaps (28), (29) are formed is to avoid contact noises between the both (between the side edge (27U), (27L) of the floor tunnel (14) and the floor tunnel (14)) that results from vibration of the vehicle body in driving of the vehicle, to thus eliminate the cause of noise occurring in the vehicle compartment.

With the above-described arrangement, the vehicle body structure according to the preferred embodiment of the present invention enables an improvement in stiffness of the vehicle body against side impact.

Namely, in this vehicle body structure, because the additional cross member (20) as well as the cross members (15), (16) is provided on the front floor (11) supporting the base of the center pillar (13), the stiffness of this portion of the front floor (11) against side impact can be considerably increased, and it is possible to reduce the amount of penetration of the center pillar (13) into the vehicle compartment when impact force toward the vehicle compartment is applied to the center pillar (13).

This improves the stiffness of the vehicle body against side impact and surely maintains a space of the vehicle compartment in side collision without the necessity of reinforcing the center pillar (13), the side sill (12), and a front pillar (not shown).

Especially, in this embodiment, the additional cross member (20) has plural closed sections (two sections in this embodiment) extending in the direction of the width of the vehicle body, and this efficiently rises the stiffness of the vehicle body against side impact.

Further, in this embodiment, the upper panel (20U) and the lower panel (20L) are integrated to construct the additional member 20 as single part in advance, and the additional member 20 is disposed on the front floor (11) integrated with the cross members (15), (16) etc. and is fastened on the vehicle body by a bolt. Therefore, the additional member 20 can be mounted on the vehicle body anytime as occasion demands.

Accordingly, if an increased stiffness of a floor against side impact is required, the additional cross member (20) is mounted on the vehicle body, if not, the additional cross member (20) is not mounted on the vehicle body and the mounting space for the additional cross member (20) (i.e. space under all seats) can be used for other purposes, such as for installation of an automobile navigation system and CD units, etc.

Although in the present embodiment, the additional cross member (20) is fastened to the vehicle body by the bolt, this is not limitative, but the additional cross member (20) may be mounted on the vehicle body in other connecting ways such as spot welding.

It should be understood, however, that there is no intention to limit the invention to the embodiment disclosed, but on the contrary, the invention is to cover all modifications, alternate constructions and equivalents falling within the spirit and scope of the invention as expressed in the appended claims.

Figure 5:
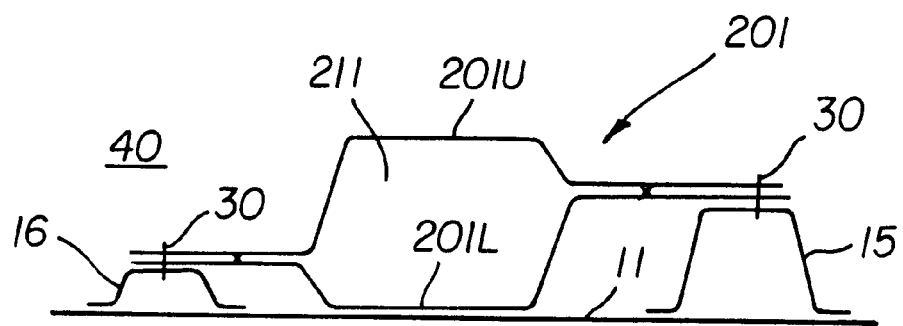
FIG. 5 is a cross-sectional view (a cross-sectional view taken along an arrow A—A in FIG. 1) showing a principal part of a variation of the vehicle body structure according to the embodiment.

For example, although in the above-described embodiment, the additional cross member has two closed sections (24), (25) extending in the direction of the width of the vehicle body, it is possible to provide three or more closed sections, and also, as is the case with an additional cross member 201 in FIG. 5, only one closed section (211) may be formed by an upper panel (201U) and a lower panel (201L).

Further, to form such closed section, as is the case with an additional cross member 202 in FIG. 5, plural (two in this example) or single closed section(s) may be formed by bending at least one of an upper panel (202U) and an lower panel (202L) (the lower panel 202L in this example) mainly.

Figure 6:
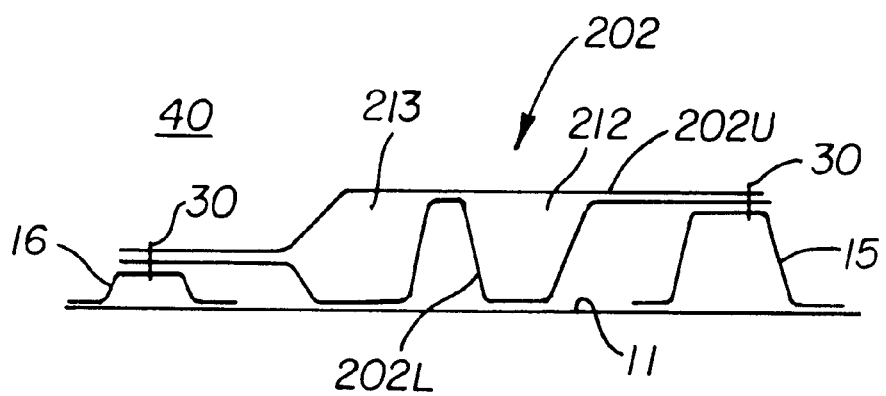
FIG. 6 is a cross-sectional view (a view correspond to a cross-sectional view taken along an arrow A—A in FIG. 1) showing a principal part of a second variation of the vehicle body structure according to the embodiment.

Furthermore, the shape of the closed section is not limited to the above embodiment (FIG. 3) or the above variations (FIG. 5, FIG. 6) insofar as the shape of the closed section has an effect of raising the stiffness.

Figure 7:
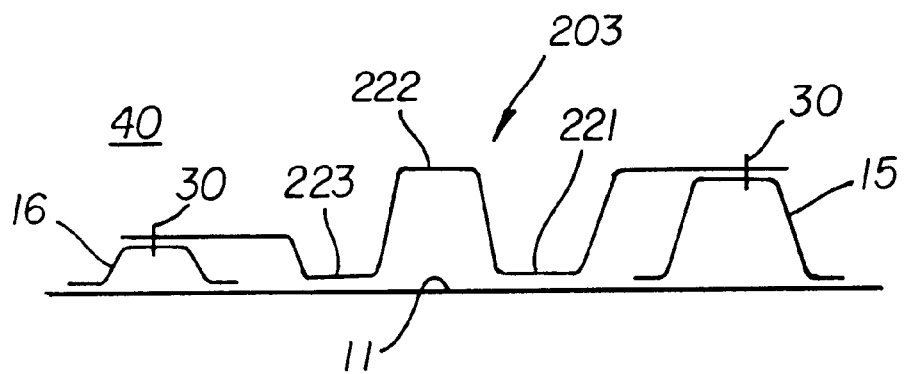
FIG. 7 is a cross-sectional view (a view correspond to a cross-sectional view taken along an arrow A—A in FIG. 1) showing a principal part of a third variation of the vehicle body structure according to the embodiment.

In addition, it may be considered that the additional cross member has no closed section. For example, as shown in FIG. 7, the additional cross member (203) may be comprised of single panel, and one or plural dent(s) and projection(s) (222, 223) on the panel, namely, the panel is convoluted to effectively improve the stiffness against side impact.

What is claimed is:

1. A vehicle body structure comprising:
a side sill portion provided at both sides of the vehicle body;
a floor tunnel portion provided in a longitudinal direction in a middle of the vehicle body;
a floor portion disposed between said side sill portion and said floor tunnel portion;
a first cross member disposed on said floor portion, having one end thereof connected to said side sill portion and the other end thereof connected to said floor tunnel portion and supporting a front side of a seat;
a second cross member provided in rear of the first cross member above said floor portion, having one end thereof connected to said side sill portion and the other end thereof connected to said floor tunnel portion and supporting a rear side of the seat; and
a third cross member provided between said first cross member and said second cross member above said floor portion in substantially parallel, having one end thereof connected to said side sill portion, a front edge thereof connected to said first cross member, and a rear edge thereof connected to said second cross member.

2. A vehicle body structure according to claim 1, wherein said third cross member has a closed section extending in a direction of width of the vehicle body.

3. A vehicle body structure according to claim 1, wherein other end of said third cross member is provided with a gap with respect to the floor tunnel portion.

4. A vehicle body structure according to claim 1, wherein said third cross member has an upper panel and a lower panel that are stacked on each other.

5. A vehicle body structure according to claim 4, wherein said third cross member has a closed section.

6. A vehicle body structure according to claim 5, wherein said closed section extends in a direction of width of the vehicle body.

7. A vehicle body structure according to claim 5, wherein said closed section is formed by bending at least one of the upper panel and the lower panel.

8. A vehicle body structure according to claim 1, wherein said third cross member is comprised of a single panel having at least one dent and projection on said panel.

* * * * *